United States Patent [19]

Coughlin et al.

[11] Patent Number: 4,700,248
[45] Date of Patent: Oct. 13, 1987

[54] MAGNETIC HEAD ASSEMBLY WITH ANGLED SLOTS

[75] Inventors: Thomas M. Coughlin, Charlestown; Fawwaz Habbal, Cambridge; Jane H. Lee, Somerville, all of Mass.

[73] Assignee: Polaroid Corporation, Cambridge, Mass.

[21] Appl. No.: 840,214

[22] Filed: Mar. 17, 1986

[51] Int. Cl.$^4$ .................. G11B 5/60; G11B 15/64; G11B 17/32
[52] U.S. Cl. .................................... 360/103; 360/102
[58] Field of Search ........................... 360/102, 103

[56] References Cited

U.S. PATENT DOCUMENTS

| | | | |
|---|---|---|---|
| 4,163,267 | 7/1979 | DeMoss | 360/102 |
| 4,195,322 | 3/1980 | Cox et al. | 360/103 |
| 4,330,804 | 5/1982 | DeMoss | 360/102 |
| 4,375,656 | 3/1983 | Rudman, Jr. et al. | 360/102 |
| 4,396,965 | 8/1983 | DeMoss | 360/102 |
| 4,553,184 | 11/1985 | Ogishima | 360/103 |

FOREIGN PATENT DOCUMENTS

| | | | |
|---|---|---|---|
| 54-8514 | 1/1979 | Japan | 360/103 |
| 0071249 | 7/1982 | Japan | |
| 59-186171 | 10/1984 | Japan | 360/103 |
| 60-47278 | 3/1985 | Japan | 360/103 |
| 60-101781 | 6/1985 | Japan | 360/103 |

OTHER PUBLICATIONS

IBM/TDB, vol. 22, No. 4, Sep. 1979, "Nonuniform Bleed Slot Spacing . . . ", by Bengal et al.
IBM/TDB, vol. 24, No. 7A, Dec. 1981, "Sloted Magnetic Head for Flexible Media", by Groom, Jr.
"Design of Low Flying Heads for Floppy Disk Magnetic Recording", by James W. White, IEEE Transactions on Magnetics, vol. Mag-20, No. 5, Sep. 1984.

Primary Examiner—John H. Wolff
Attorney, Agent, or Firm—John S. Vale

[57] ABSTRACT

A flying magnetic head assembly for use with a flexible magnetic disk is provided with a pair of angled or inclined pressure relief slots formed in a contoured face of the head which is configured to be spaced from the recording surface of the rotating disk by an intervening air bearing. The angled slot configuration exhibits low flying height and an expanded area of minimum spacing.

4 Claims, 5 Drawing Figures

MAGNETIC HEAD ASSEMBLY WITH ANGLED SLOTS

BACKGROUND OF THE INVENTION

The present invention relates to the field of magnetic data recording devices and, more specifically, to a flying magnetic head assembly for use with flexible magnetic data recording disks.

Flexible disk files commonly are used as peripheral mass digital data storage units in micro and minicomputer systems. A flexible disk file comprises a magnetic recording medium, in the form of a flexible or floppy disk, and a disk drive unit which spins the disk and records (writes)/reads data thereon with a magnetic transducer incorporated in a head assembly.

Commercially available 8, 5¼ and 3½ inch flexible disk drives typically employ a button type of head assembly that makes contact with the magnetic recording layer coated on the disk. This is done to minimize the area of incident magnetic flux, thereby increasing linear bit density along the recording track.

Abrasive wear at the head/medium interface generally is not a problem. This is because specified data transfer rates can be achieved at modest disk rotational speeds (300 RPM or thereabout) and the linear bit density (typically 8-10 KPCi for commercially available disks) can be obtained with magnetic layers having a sufficient amount of resin and lubricants incorporated in the binder system to resist abrasion at these speeds.

However, with the rapid development of more powerful and faster computer systems, there is a pressing need to significantly improve the recorded bit density levels and data transfer rates of flexible disk files.

To obtain higher density, the magnetic recording layer will have to be much thinner and therefore more fragile. Also, the rotational speed of the disk will have to increase significantly to accommodate higher transfer rates.

Those skilled in the art will recognize that the combination of a more fragile recording layer and higher disk speed will present significant durability problems if the head assembly is designed to make frictional contact with the recording layer. A preferable approach is to bypass the wear problem by employing a non-contacting or "flying" head assembly that is separated from the disk surface by a submicron intervening lubricating air cushion or bearing. This approach is, of course, well known in the art of fixed or hard disk files which utilize flying heads.

The objective of a flying head system is to avoid contact between the head and medium so as to prevent damage to either but yet minimize head/disk spacing or "flying height" to maximize bit density. It is equally important that the head be stable in its flight and maintain a constant head/disk spacing in the interest of read/write reliability.

Although flying heads have been employed successfully in hard or rigid disk files, the aerodynamic design of such heads generally have been found inadequate for use with flexible disks. One reason for this is the substantial difference in the "flying environments".

In a hard disk drive, the magnetic recording layer is supported on a rigid metal base which does not deflect when subjected to pressure loads developed in the air bearing. This means the recording surface is maintained in a fixed and well defined plane that provides a stable flying environment.

On the other hand, the flexible disk has its magnetic layer supported on a compliant plastic film base and it tends to deform under pressure loading. Also, while it is intended that the plastic base be flat, in reality, flexible disks generally exhibit a small amount of warp or curl which may induce vibrations when the disk spins. Thus the flexible disk flying environment tends to be much more dynamic and complex. Other parameters that contribute to the complexity of the flexible disk flying environment include the stiffness of the medium; the response of the plastic base material to changes in temperature and humidity; the dynamic effects of the jacket or cassette in which the disk is enclosed; and head penetration and loading.

Flying head assemblies used with flexible disks typically comprise a support structure which mounts the read/write transducer with the transducer gap disposed on a compound curve (e.g. spherical) contoured face of the head that confronts the disk to establish the head/-disk interface.

As is well known to those skilled in the art, in response to disk rotation, a thin layer of air adjacent to the recording layer surface is set in motion thereby establishing a Bernoulli effect air film which may serve as a lubricating air bearing between the head face and the recording surface.

Generally, the hydrodynamic resistance of the air film, which increases with rotational speed, is sufficiently large so that the head must be urged toward the disk with the application of an external force to reduce flying height to submicron levels (4) microinches and below) required for high density recording. This causes the air layer to be compressed and substantially increases pressure at the head medium interface. In response to the increased pressure, the flexible medium tends to dimple or buckle forming a dome at the interface that conforms somewhat to the curved contour of the head face. Often, to achieve low flying heights in the dome region the head is operated in a penetration mode wherein the face extends through the nominal plane of the recording surface and into the dome region.

It is preferable to minimize the loading force and amount of head penetration because at desirably low flying heights below 4 microinches because wear becomes an issue. At these very low flying heights unintentional contact may be made on an intermittent basis because of variations in coating thickness over the disk surfaces and/or variation in the plastic film base configuration which may be induced by changes in temperature and humidity or caused by manufacturing variances.

One approach, known in the prior art, to obtaining smaller disk/head spacing without increasing head loading is to selectively reduce pressure in the air bearing at the disk/medium interface by providing a pair of parallel slots which straddle the transducer gap and extend longitudinally along the face in a direction substantially parallel to the direction of media movement past the gap (along the track). For a representative example of a flying head with parallel slots used to reduce flying height relative to a flexible disk, reference may be had to U.S. Pat. Nos. 4,163,267; 4,330,804; 4,375,656; and 4,396,965.

Quantitively, the flying height characteristics of a head assembly is expressed in terms of the minimum spacing between the head face and disk surface. But it equally, if not more, important to examine this parameter qualitatively in terms of the area or zone of minimum spacing. If the area of minimum spacing (both in the radial and circumferential directions) is very small, the transducer must be precisely mounted on the support structure so that the gap is centered in the minimum spacing area to obtain the benefits of the low flying height. However, if the head is configured so that the area of minimum spacing is relatively large, manufacturing tolerances can be relaxed somewhat resulting in a substantial reduction in manufacturing cost.

In a paper entitled "Design of Low Flying Heads for Floppy Disk Recording", IEEE TRANSACTIONS ON MAGNETICS, Vol. Mag-20 No. 5, September 1984 by James A. White, the author discusses a computer model of the floppy disk/flying head interface. Simulations of spherical contour heads having a pair of parallel slots or a single transverse slot (perpendicular to the direction of media movement past the head) for ambient pressure relief at the interface are discussed. The results show both configurations produce very low clearances or flying height but neither produces a flat uniform clearance region (area of minimum spacing) in the vicinity of the spherical face apex where the transducer gap is normally located.

Therefore, it is a primary object of the present invention to provide a magnetic head assembly for use with a flexible magnetic disk that is characterized by its low flying height and relatively large area of minimum spacing.

Another object is to provide such a head assembly that exhibits these characteristics with relatively low head loading and penetration to minimize concern about head and/or disk wear.

Yet another object is to provide a magnetic head assembly for use with a flexible disk that exhibits desirable flying characteristics at head/disk spacings below 4 microinches.

Still another object is to provide such a head assembly which allows relaxation of gap position tolerances in the manufacturing process.

Other objects of the invention will, in part, be obvious and will, in part, appear hereinafter.

SUMMARY OF THE INVENTION

The present invention provides a magnetic head assembly, of the flying type, which is configured to be spaced from a recording surface of a rotating flexible magnetic recording disk by an intervening air bearing which influences minimum spacing and the area of such minimum spacing.

The head assembly comprises a magnetic transducer having a transducing gap and means for supporting the transducer in a manner forming a head structure which includes a contoured face having the gap thereon and which is adapted to be spaced from the recording surface by an air bearing developed in response to disk rotation. The gap is located on a longitudinally extending line along the face which is substantially parallel to the direction of movement of the recording surface past the gap.

The contoured face also has a pair of slots formed therein which are symmetrically disposed and angled with respect to the line for modifying air bearing pressure at the face/recording surface interface whereby minimum spacing is reduced and the area of minimum spacing is expanded.

In the illustrated preferred embodiments the face has a spherical contour and the angled slots diverge when viewed from the upstream side of the face toward the downstream side.

In one embodiment the angled slots intersect on the upstream side of the face and in another embodiment they do not.

BRIEF DESCRIPTION OF THE DRAWINGS

For a fuller understanding of the nature and objects of the present invention, reference may be had to the following detailed description along with the accompanying drawings wherein.

DESCRIPTION OF THE PREFERRED EMBODIMENT

Figure 1:
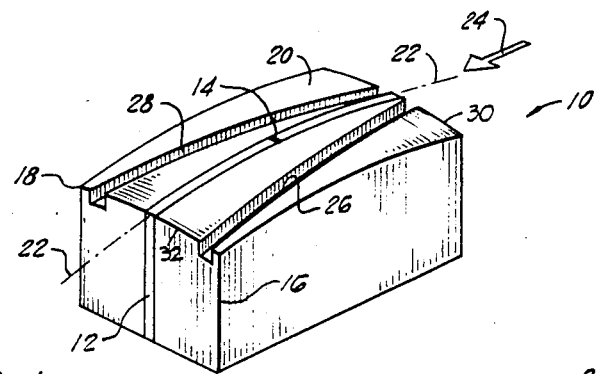
FIG. 1 is a perspective view of a head assembly embodying the present invention having a pair of nonintersecting angled slots formed in the contoured face.

FIG. 1 shows a magnetic head assembly 10, embodying the present invention, which is adapted to be spaced from a recording surface of a rotating flexible magnetic recording disk by an intervening air bearing or layer which influences the minimum spacing between the assembly and surface as well as the area or region of such minimum spacing.

Assembly 10 comprises a thin magnetic transducer 12, in the form of a conventional ferrite core having a transducing or flux gap 14 and windings (not shown) and a pair of transducer support members 16 and 18, formed of ceramic, glass or any other appropriate nonmagnetic material, bonded to the opposite sides of transducer 12 in a manner forming a laminated head structure including a contoured face 20 having gap 14 thereon. It is this surface 20 of assembly 10 that is adapted to confront the rotating recording surface of the disk and interact with the air bearing layer to provide assembly 10 with its flying characteristics.

It should be understood that transducer 12 may be of the thin film type rather than the illustrated conventional core type.

In the illustrated embodiment, assembly 10 is a generally parallelpiped shaped structure in which the face 20 has been lapped and polished, or otherwise formed, to have a convex compound curve contour, preferably a spherical contour. The transducing gap 14 lies on a longitudinally extending line 22, preferably a centerline, along face 20 which is substantially parallel to the direction of tangential movement of the rotating recording surface past gap 14, indicated by the direction arrow 24. In the illustrated embodiment gap 14 is located at its preferred location at the midpoint of line 22 whereby it is positioned at the apex of face 20.

Assembly 10 also includes a pair of angled pressure relief slots 26 and 28 formed in face 20 which are symmetrically disposed and angled with respect to the line 22 and function to modify air bearing pressure at the face/recording surface interface in a manner whereby minimum spacing is reduced and the area of minimum spacing is expanded in comparison to other head structures which employ a pair of symmetrically disposed pressure relief slots that are parallel to line 22.

Figure 4:
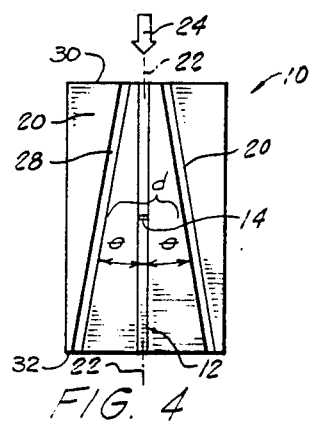
FIG. 4 is a plan view of the assembly of FIG. 1.

As best shown in FIG. 4, the symmetrical slots 26 and 28 straddle the gap 14 and each is set at an equal angle $\theta$ with respect to the centerline 22 so as to diverge from the upstream side of face 20 (from leading transverse edge 30 rearwardly toward gap 14) to the downstream side (from gap 14 rearwardly toward the trailing transverse edge 32).

In addition to the slot angle, the geometry of the slot configuration is also defined in terms of the lateral distance between the inner edges of the slots at the gap 14 shown as dimension d which is measured along a line perpendicular to line 22 at the gap 14.

In the illustrated embodiments, the slots 26 and 28 are of a depth whereby they extend along the entire length of face 20 from the leading edge 30 to the trailing edge 32. In FIGS. 1 and 4, the slot angle $\theta$ and spacing dimension d are chosen so that the slots do not intersect each other on the upstream side. That is, there is a space between the inner edges of slots 26 and 28 at edge 30.

Figure 2:
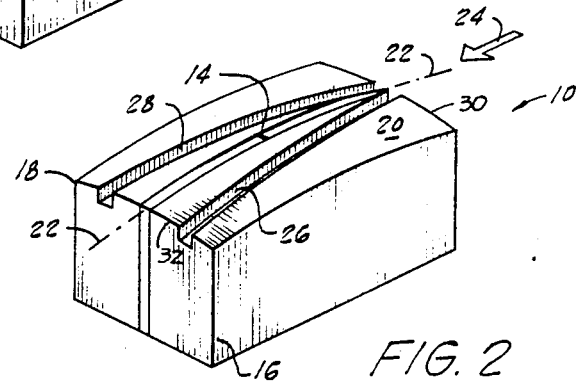
FIG. 2 is a perspective view of a head assembly having a pair of intersecting angled slots.
Figure 5:
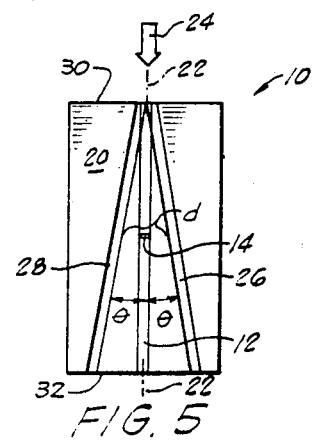
FIG. 5 is a plan view of the assembly of FIG. 2.

FIGS. 2 and 5, on the other hand, show an alternative embodiment wherein $\theta$ and d are chosen so that the slots do intersect but do not cross. In this case, the intersection takes place between the apex and the leading edge 30.

While slot angle $\theta$ and spacing d define the geometry of slot structure, some consideration also must be given to slot width and depth in that they relate to the volume of pressure modifying structure introduced into the moving air stream between face 20 and the rotating disk surface.

Figure 3:
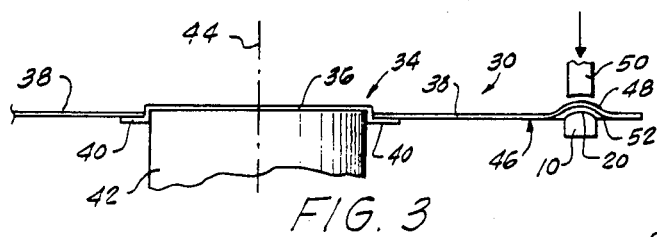
FIG. 3 is a diagrammatic representation of the head assembly in operative relation with a flexible disk.

FIG. 3 is a diagrammatic representation showing the head assembly 10 in operative read/write relationship with a rotating flexible magnetic data recording disk 34.

In the illustrated embodiment, disk 34 comprises a hat shaped metal hub 36 having an annular flexible magnetic recording medium 38 attached at its inner edge to a peripheral flange 40 of hub 36. The hub 36 is mounted on a rotatable drive shaft 42 of a disk drive for rotating medium 38 in a substantially horizontal plane about a vertical axis of rotation 44.

The recording medium 38 comprises a flexible plastic base having a magnetic recording layer coated on opposite sides thereof. In FIG. 3, head assembly 10 is positioned with face 20 confronting a recording surface 46 of the recording layer on the underside of medium 38.

Although not shown in FIG. 3 the disk 34 generally is enclosed in a jacket or cassette that has a pair of radially extending slots in the outer walls which provide access for the recording head. As will become apparent later, the disk 34 used for testing head assembly 10 were packaged in a standard 3½ inch disk jacket.

The head assembly 10 may be mounted on a fixed or gimballed support for radial movement relative to disk 34 in a known manner. It is well known in the art, when disk 34 is rotated, a thin film of air in contact with each recording surface is set in motion and generates a thin Bernoulli film that may be used to provide a lubricating air bearing between the head and disk which keep them out of contact to prevent damage to either.

The air bearing provides a significant hydrodynamic resistance to reducing the head to disk spacing. As the head is moved toward the disk surface 46, the air in the bearing at the interface undergoes compression and the bearing pressure increases. Under this pressure loading, the flexible medium 38 tends to buckle or deform which creates a localized dimple or dome 48 over face 20. The interior of the dome is more or less spherical in that it tends to conform to the spherical contour of face 20.

In light of the dome formation, the head assembly 10 generally must be advanced through the nominal plane of disk rotation and into the dome region to reduce the spacing between gap 14 and surface 46 to an acceptable submicron level (preferably below 4 microinches) needed for high density recording. When the face 20 extends through the nominal plane into the dome region it is said to be operating in a penetration mode. Positive penetration means the face has been advanced through the nominal plane toward the disk. At zero penetration, face 20 would be at the nominal plane. Negative penetration means that face 20 is backed off from the nominal plane.

To reduce the spacing or flying height to acceptable levels, it is generally necessary to urge the head toward the disk (or urge the disk toward the head) with an externally applied force or load. In the illustrated embodiment the load is applied with an external low friction pressure pad 50 which engages the opposite side of medium 38 in vertical alignment with the penetrating face 20. In the interest of minimizing wear at low-flying heights, it is desirable to keep the loading force and amount of penetration as low as possible while maintaining a constant minimum head/disk spacing in the intervening air bearing 52 between face 20 and surface 46.

As noted earlier, not only is it important that the flying height of the head be low to maximize linear bit density, but the area of minimum spacing should be uniform over as large an area as possible in the vicinity of gap 14 to allow relaxation of gap position tolerances and thereby gain the benefit of reduced manufacturing cost of the head assembly.

Measuring flying heights below 5 microinches and ascertaining the area of minimum spacing has been at best a difficult task. Such measurements typically have been made in the past using white light interferometry techniques. One disadvantage of this technique is that the gap between the head and disk is measured on a point-by-point basis and obtaining a plot of the area of minimum spacing involves measuring a plurality of different points in both the circumferential and radial directions.

However, observation of flying characteristics is now made quite simple and accurate by employing a frustrated total internal reflection (FTIR) imaging system that provides a realtime 3D contour map of the head/medium space or alternatively provides a 2D color contour map of the space wherein different heights in 1 or 2 microinch increments appear as different colors on a calibrated height scale. With such a system it is possible to resolve spaces as small as about 0.5 microinches. For detailed description of the FTIR imaging system, reference may be had to commonly assigned copending patent application U.S. Ser. No. 834,532 filed on Feb. 28, 1981 by John Guerra and William Plummer and entitled "Optical Proximity Imaging Method and Apparatus".

To evaluate the performance of head assemblies having angled slots versus those having parallel slots, simulated head assemblies of both types were fabricated from glass.

The glass heads were fabricated from a 0.200 inch diameter rod which was lapped and polished at one end to provide a spherically contoured face 20 having a relatively large radius of 2.3 inches. Vertical flats were formed on opposite sides of the rod and glass prisms were optically bonded thereto. The prisms serve as light entry and exit posts for a beam of light that is totally internally reflected from the interior surface of face 20. The total internal reflection gives rise to a evanscent wave field that projects outwardly from surface 20 into the air gap between the head and recording surface.

The presence of the recording surface in the wavefield acts to frustrate total internal reflection which is evidenced by a gray scale pattern or patch that is indicative of the spacing at the head/medium interface. The various shades of gray in the pattern have been correlated to distance allowing this optical output to be electrically manipulated and displayed as a 2D or 3D scaled contour map on a real time basis utilizing the FTIR image system noted above.

With the formation of the flats, the spherical face 20 has a longitudinal length of about 0.180 inches between the leading upstream edge 30 and the opposite trailing or downstream edge 32.

For the angled slot configurations the slot width was 0.010 inches or 10 mils and the depth was 0.005 inches or 5 mils at the apex. A representative example of a diverging angled slot configuration observed in which the slots do not intersect and are spaced apart at the upstream edge 30 include a head designated (d/0°) 20/5°, where d equals the transverse distance, in mils, between the inner edges of the slots 26 and 28 at the apex where the gap is to be located, and θ is the angle in degrees between each slot and the longitudinally extending line 22 along which the gap is to be located. Representative examples of heads in which the slots intersect, but do not cross, at or near the upstream edge 30 include 10/5°, 10/10°, 15/10° and 20/15°.

For comparison purposes glass head structures having a pair of parallel pressure relief slots from therein were also observed. The slot width and depth were the same and the distance d between the inner edges of the slots were 10, 15, and 20 mils. Also the performance of parallel slot heads having narrower (5 mil) slots and wider (15 and 20 mil) slots were observed.

These head assembly were tested with flexible disks packaged in a standard 3½ inch format jacket. The disk had a 3 mil flexible base and was coated on both sides with a magnetic recording layer having a thickness in the range of 0.5 to 1 microns and a surface roughness of approximately 200 Å RMS.

The observations were made at a disk rotation speed of 1200 RPM, which is appropriate for higher data transfer rates, and the radial position of the head was varied over the entire data recording area between the inner and outer track positions. The head was loaded with a relatively light force of 5 grams utilizing a pressure pad 50 on the opposite side of the disk, and head penetration was set at 3 mils or less. It should be understood the FTIR system is useful for observing head spacing at other rotational speeds and loads.

From observing color contour plots of the face/medium interface provided by the FTIR imaging system, it is apparent that the head assemblies having angled slots tend to fly at lower heights, approximately 2 microinches or lower, while the parallel slot head assemblies tend to fly a bit higher in the 2 to 4 microinch range. But, more importantly, the angled slot configurations tend to exhibit significantly larger areas of minimum spacing which appear to be centered on the apex. Not only is the area of minimum spacing expanded, but it exhibits good extention in both the radial and circumferential directions. In many instances the area of minimum spacing exhibits a symmetry about the apex extending longitudinally well forward and rearwardly of the apex and transversely to the inner edges of the angled slots 26 and 28. On the other hand, the area of minimum spacing observed in the parallel slot configurations, tended to be relatively small and not as well centered with respect to the apex.

Those skilled in the art will recognize that the angled slot configurations set forth above may be modified by using different slot angles, dimensions and spacings, or different combinations of these parameters without departing from the spirit and scope of the invention involved herein. Because of this, it is intended that angled slot head assemblies described herein or shown in the accompanying drawing be interpreted as illustrative, and not in a limiting sense.

What is claimed is:

1. A magnetic head assembly configured to be spaced from a recording surface of a rotating flexible magnetic recording disk by an intervening air bearing which influences minimum spacing and the area of minimum spacing, said head assembly comprising:

means for supporting said transducer in a manner forming a head structure including a spherically contoured face having said gap thereon and being configured to be shaped from the recording surface by an air bearing developed in response to disk rotation, said gap being located at the apex of said face on a longitudinally extending line along said face which is substantially parallel to the direction of movement of the recording surface past said gap, said face also having a pair of slots formed therein which are symmetrically disposed and angled with respect to said line, so as to diverge when viewed from the upstream side of said face toward the downstream side, for modifying air bearing pressure at the face/recording surface interface whereby minimum spacing is reduced and area of minimum spacing is expanded; said face having a radius of 2.3 inches, said slots having a width of 0.010 inches, and a depth of 0.005 inches at said apex whereby said head is operable in the penetration mode at a flying height of 2 microinches or lower.

2. The head assembly of claim 1 wherein said pair of slots intersect on the upstream side of said face.

3. The head assembly of claim 1 wherein said pair of angled slots do not intersect on said face.

4. The head assembly of claim 1 wherein the angle of each of said slots with respect to said line is in the range of 5 to 15 degrees and the spacing between the inner edges of said slot at said gap is in the range of 10 to 20 mils.

* * * * *